United States Patent
Matsunobu et al.

(10) Patent No.: US 11,795,288 B2
(45) Date of Patent: Oct. 24, 2023

(54) PRODUCTION METHOD OF RESIN POROUS MATERIAL

(71) Applicant: PRIME PLANET ENERGY & SOLUTIONS, INC., Tokyo (JP)

(72) Inventors: Kohei Matsunobu, Toyota (JP); Akio Minakuchi, Okazaki (JP)

(73) Assignee: Prime Planet Energy & Solutions, Inc., Tokyo (JP)

( * ) Notice: Subject to any disclaimer, the term of this patent is extended or adjusted under 35 U.S.C. 154(b) by 197 days.

(21) Appl. No.: 17/495,271

(22) Filed: Oct. 6, 2021

(65) Prior Publication Data

US 2022/0119612 A1 Apr. 21, 2022

(30) Foreign Application Priority Data

Oct. 15, 2020 (JP) .................................. 2020-173670

(51) Int. Cl.
  *C08J 9/28* (2006.01)
  *H01M 50/491* (2021.01)
  *H01M 50/417* (2021.01)

(52) U.S. Cl.
  CPC ............. *C08J 9/28* (2013.01); *H01M 50/417* (2021.01); *H01M 50/491* (2021.01); *C08J 2201/0502* (2013.01); *C08J 2323/08* (2013.01)

(58) Field of Classification Search
  CPC .. C08J 9/28; C08J 2201/0502; C08J 2323/08; C08J 2201/04; C08J 2201/05; C08J 2301/12; C08J 2327/16; C08J 2329/04; H01M 50/417; H01M 50/491; H01M 4/13; H01M 50/403; H01M 50/46; Y02E 60/10

See application file for complete search history.

(56) References Cited

U.S. PATENT DOCUMENTS

| | | |
|---|---|---|
| 3,450,650 A | 6/1969 | Murata |
| 5,238,636 A | 8/1993 | Furukawa et al. |
| 6,177,181 B1 | 1/2001 | Hamada et al. |
| 2007/0134548 A1 | 6/2007 | Wensley et al. |
| 2011/0024935 A1 | 2/2011 | Ito et al. |

(Continued)

FOREIGN PATENT DOCUMENTS

| | | | |
|---|---|---|---|
| CN | 110808348 A | 2/2020 | |
| GB | 2031792 A | * 4/1980 | ......... B01D 67/0009 |
| JP | S 48-19216 B1 | 6/1973 | |

(Continued)

*Primary Examiner* — K. Boyle
(74) *Attorney, Agent, or Firm* — Finnegan, Henderson, Farabow, Garrett & Dunner, LLP.

(57) ABSTRACT

Provided is a method that can produce a resin porous material from a water-insoluble polymer in a small number of steps while suppressing the formation of skin layers. The production method of the resin porous material disclosed herein includes preparing a solution of a water-insoluble polymer in a mixed solvent including a good solvent of the water-insoluble polymer and a first poor solvent of the water-insoluble polymer, and vaporizing and removing the mixed solvent from the solution. The first poor solvent has a higher boiling point than the good solvent. In vaporizing and removing the mixed solvent, the mixed solvent is vaporized and removed under the presence of vapor of a second poor solvent of the water-insoluble polymer to form pores and obtain a porous material.

6 Claims, 4 Drawing Sheets

(56) References Cited

U.S. PATENT DOCUMENTS

2019/0367699 A1  12/2019  Minakuchi et al.
2020/0044217 A1   2/2020  Minakuchi et al.

FOREIGN PATENT DOCUMENTS

| JP | 2003-155371 A | | 5/2003 |
|----|---------------|---|--------|
| JP | 2004-111157 A | | 4/2004 |
| JP | 2005-133080 A | | 5/2005 |
| JP | 2010-067358 A | | 3/2010 |
| JP | 2010067358 A | * | 3/2010 |
| JP | 2011-032314 A | | 2/2011 |
| JP | 2011-119276 A | | 6/2011 |
| JP | 2011-236292 A | | 11/2011 |
| JP | 2017-164726 A | | 9/2017 |
| JP | 2021-134277 A | | 9/2021 |
| WO | WO 89/08679 A1 | | 9/1989 |
| WO | WO 98/025997 A1 | | 6/1998 |

* cited by examiner

PRODUCTION METHOD OF RESIN POROUS MATERIAL

BACKGROUND OF THE INVENTION

1. Field of the Invention

The present disclosure relates to a production method of a resin porous material. This application claims the benefit of foreign priority to Japanese Patent Application No. 2020-173670, filed on Oct. 15, 2020, the entire contents of which are incorporated herein by reference.

2. Description of the Related Art

Resin porous materials using water-insoluble polymers may exhibit various characteristics such as lightness, cushioning characteristics, thermal insulation properties, sound-absorbing properties, separability, and adsorptive properties. Thus, resin porous materials using water-insoluble polymers are used in a wide variety of uses, for example, for packing materials, construction materials, sound-absorbing materials, cleaning utensils, cosmetic utensils, separation membranes, adsorbing materials, purification carriers, catalyst carriers, culture carriers, and the like.

A simple method is desired for a production method of a resin porous material using a water-insoluble polymer from the viewpoint of production costs. Thus, as a method for simply producing a porous material of polyvinylidene fluoride, which is a water-insoluble polymer, Japanese Patent Application Publication No. 2011-236292 discloses a method for producing a porous material of polyvinylidene fluoride, including the steps of dissolving polyvinylidene fluoride in a mixed solvent of a good solvent and a poor solvent of polyvinylidene fluoride under heating to prepare a solution, cooling the solution to obtain a molded body, dipping the molded body in another solvent to replace the mixed solvent by the other solvent, and drying and removing the other solvent.

SUMMARY OF THE INVENTION

However, in the production method of the above conventional technique, many steps such as the steps of preparing a solution of a water-insoluble polymer, precipitating a molded body, replacing solvents, and drying are required. As a result of the studies by the present inventors, the present inventors have found that skin layers (skinned layers) that do not have pores are easily formed at the surface of the resin porous material in the method for producing a resin porous material. When the resin porous material has skin layers, fluid cannot penetrate and thus there is a disadvantage that the uses of the resin porous material are limited.

Thus, an object of the present disclosure is to provide a method that can produce a resin porous material from a water-insoluble polymer in a small number of steps while suppressing the formation of skin layers.

The production method disclosed herein includes preparing a solution of a water-insoluble polymer in a mixed solvent including a good solvent of the water-insoluble polymer and a first poor solvent of the water-insoluble polymer, and vaporizing and removing the mixed solvent from the solution. The first poor solvent has a higher boiling point than the good solvent. In vaporizing and removing the mixed solvent, the mixed solvent is vaporized and removed under the presence of vapor of a second poor solvent of the water-insoluble polymer to form pores and obtain a porous material. According to such a constitution, a method that can produce a resin porous material from a water-insoluble polymer in a small number of steps while suppressing the formation of skin layers is provided.

In a desired mode of the production method disclosed herein, the concentration of the vapor of the second poor solvent is 6,000 ppm by volume or higher. According to such a constitution, the formation of skin layers can be more efficiently suppressed.

In a desired mode of the production method disclosed herein, the distance Ra of the second poor solvent from the HSP of the water-insoluble polymer is 10 MPa$^{1/2}$ or larger. According to such a constitution, the formation of skin layers can be more efficiently suppressed.

In a desired mode of the production method disclosed herein, the second poor solvent has a boiling point of 210° C. or lower. According to such a constitution, the formation of skin layers can be more easily suppressed.

From the viewpoint of the uses of the obtained resin porous material and the usefulness of the production method of the resin porous material, the water-insoluble polymer is an ethylene-vinyl alcohol copolymer in a desired mode of the production method disclosed herein.

The production method in a desired mode of the production method disclosed herein further includes, after preparing the solution and before vaporizing and removing the mixed solvent, applying the prepared solution of the water-insoluble polymer on a surface of a substrate in a thin film form. According to such a constitution, a method that can produce a resin porous film from a water-insoluble polymer in a small number of steps while suppressing the formation of skin layers is provided. In this case, when the substrate is an electrode of a secondary battery, an electrode-integrated separator for a secondary battery can be produced.

DESCRIPTION OF THE PREFERRED EMBODIMENTS

Figure 1:
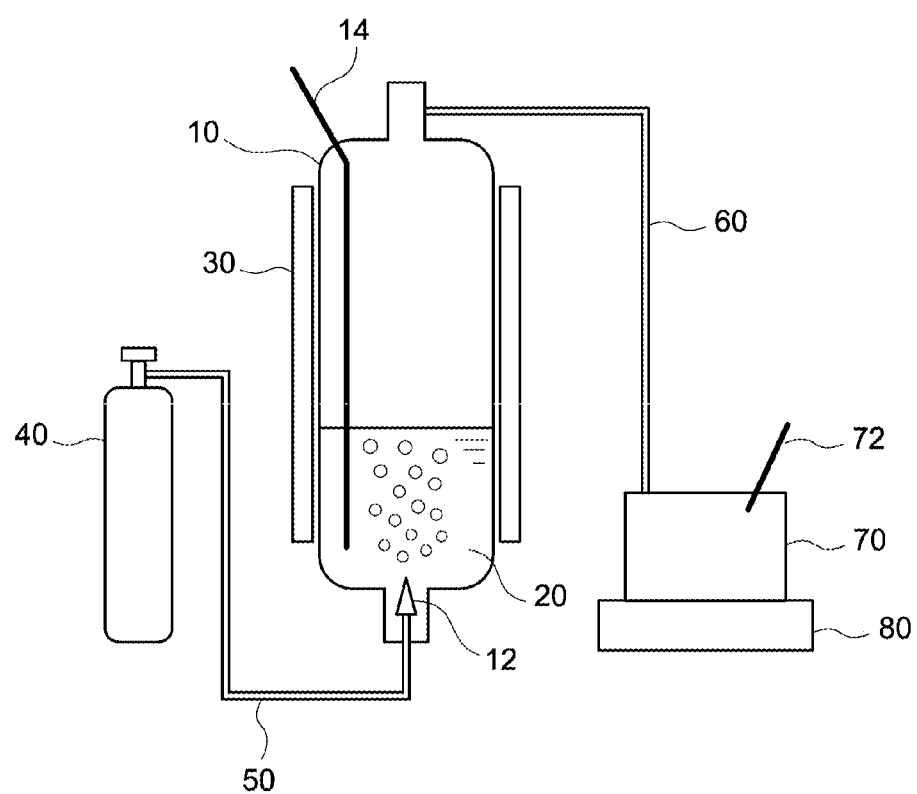
FIG. 1 is an explanatory drawing of one example of the implementation method of the mixed solvent removal step in the production method of the present disclosure.

The production method of the resin porous material according to the present disclosure includes a step of preparing a solution of a water-insoluble polymer in a mixed solvent including a good solvent of the water-insoluble polymer and a first poor solvent of the water-insoluble polymer (hereinafter, referred to as the "solution preparation step"), and a step of vaporizing and removing the mixed solvent from the solution (hereinafter, referred to as the "mixed solvent removal step"). In this case, the first poor solvent has a higher boiling point than the good solvent. In the mixed solvent removal step, the mixed solvent is vaporized and removed under the presence of vapor of a second poor solvent of the water-insoluble polymer, to form pores and obtain a porous material.

The solution preparation step is first explained. The "good solvent of a water-insoluble polymer" used in the present disclosure refers to a solvent exhibiting a solubility to a water-insoluble polymer at 25° C. of 1 mass % or more. The good solvent desirably exhibits a solubility to a water-insoluble polymer at 25° C. of 2.5 mass % or more, more desirably exhibits a solubility of 5 mass % or more, further desirably exhibits a solubility of 7.5 mass % or more, and most desirably exhibits a solubility of 10 mass % or more. The type of the good solvent used in the present disclosure may be selected, as appropriate, according to the type of the water-insoluble polymer. The good solvent may be a single solvent or may be a mixed solvent in which two or more solvents are mixed.

In the present description, the matters common to the first poor solvent of the water-insoluble polymer and the second poor solvent of the water-insoluble polymer are represented as the "poor solvent of the water-insoluble polymer" or otherwise simply represented as the "poor solvent". The "poor solvent of a water-insoluble polymer" used in the present disclosure refers to a solvent exhibiting a solubility to a water-insoluble polymer at 25° C. of less than 1 mass %. The poor solvent desirably exhibits a solubility to a water-insoluble polymer at 25° C. of 0.5 mass % or less, more desirably exhibits a solubility of 0.2 mass % or less, further desirably exhibits a solubility of 0.1 mass % or less, and most desirably exhibits a solubility of 0.05 mass % or less. The type of the poor solvent to be used in the present disclosure may be selected, as appropriate, according to the type of the water-insoluble polymer. The poor solvent may be a single solvent or may be a mixed solvent in which two or more solvents are mixed.

Hansen solubility parameters (HSP) may be used to determine whether a specific solvent is a good solvent or a poor solvent to a specific polymer compound. For example, assuming that the dispersion term, the polar term, and the hydrogen bond term of the HSP of the polymer compound are respectively taken as $\delta_{D1}$, $\delta_{P1}$, $\delta_{H1}$ and the dispersion term, the polar term, and the hydrogen bond term of the HSP of the solvent are respectively taken as $\delta_{D2}$, $\delta_{P2}$, $\delta_{H2}$, the solubility of the polymer compound tends to be higher as the value of the HSP distance Ra (MPa$^{1/2}$) between the polymer compound and the solvent represented by the following formula is smaller.

$$Ra^2 = 4(\delta_{D1}-\delta_{D2})^2 + (\delta_{P1}-\delta_{P2})^2 + (\delta_{H1}-\delta_{H2})^2$$

Assuming that the interaction radius of the specific polymer compound is taken as $R_0$, it is predicted that the specific polymer compound is soluble when the ratio Ra/$R_0$ is less than 1, partially soluble when the ratio Ra/$R_0$ is 1, and insoluble when the ratio Ra/$R_0$ exceeds 1.

Alternatively, whether a specific solvent is a good solvent or a poor solvent to a specific polymer compound can easily be judged by a test of mixing the polymer compound and the solvent in a sample bottle or the like.

In the solution preparation step, the good solvent and the first poor solvent are mixed and used as a homogeneous solvent. Thus, the good solvent and the first poor solvent are compatible with each other. In the present disclosure, the first poor solvent used has a higher boiling point than the good solvent used. The boiling point of the first poor solvent is desirably 10° C. or higher, more desirably 90° C. or higher than the boiling point of the good solvent because a homogeneous porous material with a relatively high porosity can be easily obtained. The boiling point of the first poor solvent is desirably less than 300° C. in view of the drying rate.

In the present disclosure, the "water-insoluble polymer" refers to a polymer having a solubility in water at 25° C. of less than 1 mass %. The solubility of the water-insoluble polymer in water at 25° C. is desirably 0.5 mass % or less, more desirably 0.2 mass % or less, and further desirably 0.1 mass % or less.

The "water-insoluble polymer" used in the solution preparation step is the same polymer as the water-insoluble polymer constituting the porous molded body. As the water-insoluble polymer, a polymer for which a good solvent and a poor solvent exist is used. The type of the water-insoluble polymer is not particularly limited as long as a good solvent and a poor solvent exist for the polymer. Examples of the water-insoluble polymer include olefin resins such as polyethylene and polypropylene; fluorine-containing resins such as polyvinyl fluoride and polyvinylidene fluoride; (meth) acrylic resins such as poly(methyl (meth)acrylate)s and poly(ethyl (meth)acrylate)s; styrenic resins such as polystyrene, styrene-acrylonitrile copolymers, and acrylonitrile-butadiene-styrene copolymers; water-insoluble cellulose derivatives such as ethyl cellulose, cellulose acetate, and cellulose propionate; vinyl chloride-based resins such as polyvinyl chloride and ethylene-vinyl chloride copolymers; ethylene-vinyl alcohol copolymers, and the like. Polymers obtained by modifying a water-soluble polymer into a water-insoluble polymer, or the like may also be used. Among them, the water-insoluble polymer is desirably an aliphatic polymer compound (that is, a polymer compound that does not contain an aromatic ring) in view of the usefulness of the porous material of the water-insoluble polymer and the usefulness of the production method thereof. Since a homogeneous porous material with a relatively high porosity can be easily obtained, the water-insoluble polymer is desirably an addition-polymerized polymer compound (that is, a polymer compound generated by the polymerization of ethylenically-unsaturated double bonds of monomers having the ethylenically-unsaturated double bonds; for example, a vinyl polymer, a vinylidene polymer). The water-insoluble polymer is desirably an ethylene-vinyl alcohol copolymer in view of the usefulness of the porous material having a three-dimensional network porous structure and the usefulness of the production method thereof.

Although the average polymerization degree of the water-insoluble polymer is not particularly limited, it is desirably 70 or more and 500,000 or less, and more desirably 100 or more and 200,000 or less. The average polymerization degree of the water-insoluble polymer can be determined by a known method (for example, NMR measurements, or the like).

Hereinafter, a suitable good solvent and a suitable poor solvent are specifically explained while referring to a specific water-insoluble polymer as an example. The production method of the present disclosure may be advantageously implemented by using the good solvent and the poor solvent which are described below with respect to the water-insoluble polymer as described below. The good solvent listed below may be used singly or may be used in combination of two or more of these. The poor solvent listed below may be used singly or may be used in combination of two or more of these.

1. In a Case where the Water-Insoluble Polymer is an Ethylene-Vinyl Alcohol Copolymer An ethylene-vinyl alcohol copolymer (EVOH) is a copolymer containing ethylene units and vinyl alcohol units as monomer units. Although the ethylene unit content in the EVOH is not particularly limited, it is desirably 10 mol % or more, more desirably 15 mol % or more, further desirably 20 mol % or more, and particularly desirably 25 mol % or more. The ethylene unit content in the EVOH is desirably 60 mol % or less, more desirably 50 mol % or less, and further desirably 45 mol % or less. Although the saponification degree of the EVOH is not particularly limited, it is desirably 80 mol % or more, more desirably 90 mol % or more, and further desirably 95 mol % or more. The upper limit of the saponification degree is determined depending on the technical limitations related to the saponification and is, for example, 99.99 mol %. The ethylene unit content in the EVOH and the saponification degree of the EVOH may be determined by a known method (for example, $^1$H-NMR measurement or the like).

An EVOH is normally produced by saponifying a copolymer of ethylene and a vinyl ester using an alkali catalyst and the like. Thus, an EVOH may contain vinyl ester units. The vinyl ester of the unit is typically vinyl acetate and may be vinyl formate, vinyl propionate, vinyl valerate, vinyl caprate, vinyl laurate, or the like. The EVOH may contain other monomer units than ethylene units, vinyl alcohol units, and vinyl ester units within a range that does not significantly impair the effect of the present disclosure.

As a suitable good solvent for the EVOH, a mixed solvent of water and an alcohol, dimethyl sulfoxide (DMSO), or the like may be mentioned. The alcohol used in the mixed solvent is desirably propyl alcohol. The propyl alcohol may be either n-propyl alcohol or isopropyl alcohol. Thus, a particularly suitable good solvent is a mixed solvent of water and propyl alcohol, or dimethyl sulfoxide (DMSO).

Examples of poor solvents suitable for the EVOH include water; alcohols; chain esters such as ethyl acetate; cyclic esters such as γ-butyrolactone; cyclic carbonates such as propylene carbonate; cyclic sulfones such as sulfolane; ether group-containing monools such as propylene glycol monomethyl ether, propylene glycol monoethyl ether, diethylene glycol monomethyl ether, diethylene glycol monoethyl ether, and 2-ethoxyethanol; diols such as 1,3-butanediol, 1,4-butanediol, 1,5-pentanediol, and 1,6-hexanediol; cyclic ethers such as 1,4-dioxane; ketones such as methyl ethyl ketone; and the like. Among them, as the first poor solvent, cyclic esters, cyclic carbonates, cyclic sulfones, or ether group-containing monools are desired, γ-butyrolactone, propylene carbonate, sulfolane, or ether group-containing monools are more desired, and γ-butyrolactone or sulfolane are further desired. The solubility parameter (Hildebrand SP value) δ of the first poor solvent is desirably larger than the solubility parameter δ of the EVOH by 1.6 $MPa^{1/2}$ or more. As the second poor solvent, chain esters, cyclic ethers, or ketones are desired and ethyl acetate, 1,4-dioxane, or methyl ethyl ketone are further desired.

Water and an alcohol are each a poor solvent of an EVOH. Still, a mixed solvent of water and an alcohol (particularly, propyl alcohol) is a good solvent of an EVOH. Here, the mixed solvent of water and an alcohol can be deemed as a mixed solvent of another mixed solvent, which is a good solvent, of water and an alcohol from which water is reduced and water, which is a poor solvent having a higher boiling point than the another mixed solvent, and thus, a mixed solvent of water and an alcohol may be used singly for preparing an EVOH solution. Thus, in the present disclosure, when a solvent which is a mixture of two or more types of poor solvents becomes a good solvent for a specific water-insoluble polymer, a mixed solvent of these two or more types of poor solvents may be used singly as a mixed solvent containing the good solvent of the water-insoluble polymer and the first poor solvent of the water-insoluble polymer for preparation of a solution.

2. In a Case where the Water-Insoluble Polymer is Cellulose Acetate

Example of good solvents suitable for cellulose acetate include nitrogen-containing polar solvents (particularly, nitrogen-containing aprotic polar solvents) such as N,N-dimethylformamide, N,N-dimethylacetamide, and N-methylpyrrolidone; esters such as methyl formate and methyl acetate; ketones such as acetone and cyclohexanone; cyclic ethers such as tetrahydrofuran, dioxane, and dioxolane; glycol derivatives such as methyl glycol and methyl glycol acetate; halogenated hydrocarbons such as methylene chloride, chloroform, and tetrachloroethane; cyclic carbonates such as propylene carbonate; sulfur-containing polar solvents (particularly, sulfur-containing aprotic polar solvents) such as DMSO, and the like. Among them, a sulfur-containing aprotic polar solvent is desired and DMSO is more desired.

Examples of poor solvents suitable for cellulose acetate include alcohols such as 1-hexanol, 1,3-butanediol, 1,4-butanediol, 1,5-pentanediol, and 1,6-hexanediol. As the alcohols, $C_{4-6}$ monohydric or dihydric alcohols are desired.

3. In a Case where the Water-Insoluble Polymer is Polyvinylidene Fluoride

Examples of good solvents suitable for polyvinylidene fluoride include nitrogen-containing polar solvents (particularly, nitrogen-containing aprotic polar solvents) such as N,N-dimethylformamide, N,N-dimethylacetamide, and N-methylpyrrolidone; sulfur-containing polar solvents (particularly, sulfur-containing aprotic polar solvents) such as DMSO, and the like. Among them, nitrogen-containing aprotic polar solvents are desired and N,N-dimethylformamide is more desired.

Examples of poor solvents suitable for polyvinylidene fluoride include alcohols such as 1-hexanol, 1,3-butanediol, 1,4-butanediol, 1,5-pentanediol, 1,6-hexanediol, and glycerin; cyclic ethers such as tetrahydrofuran, dioxane, and dioxolane, or the like. Among them, alcohols are desired and $C_{3-6}$ dihydric or trihydric alcohols are more desired.

4. In a Case where the Water-Insoluble Polymer is a Vinylidene Fluoride-hexafluoropropylene Copolymer A vinylidene fluoride-hexafluoropropylene copolymer (P(VDF-HFP)) is a copolymer containing vinylidene fluoride units and hexafluoropropylene units as monomer units. The copolymerization proportion of these units is not particularly limited and may be determined depending on the characteristics of the separator. Vinylidene fluoride-hexafluoropropylene copolymers are available by syntheses according to known methods and also some products (for example, Kynar FLEX 2850-00, 2800-00, 2800-20, 2750-01, 2500-20, 3120-50, 2851-00, 2801-00, 2821-00, 2751-00, 2501-00, etc., all produced by Arkema S.A.) are commercially available.

Examples of good solvents suitable for the P(VDF-HFP) include ketones such as acetone and methyl ethyl ketone; cyclic ethers such as tetrahydrofuran; nitrogen-containing polar solvents (particularly, nitrogen-containing aprotic polar solvents) such as N,N-dimethylformamide, N,N-dimethylacetamide, and N-methylpyrrolidone; sulfur-containing polar solvents (particularly, sulfur-containing aprotic polar solvents) such as DMSO, or the like. Since it is easy to remove the solvent by vaporization, acetone, methyl ethyl ketone, or tetrahydrofuran is desired, and acetone or methyl ethyl ketone is more desired as the good solvent.

Examples of suitable poor solvents for the P(VDF-HFP) include water, alcohols such as 1-hexanol, 1,2-propanediol, 1,3-butanediol, 1,4-butanediol, 1,5-pentanediol, 1,6-hexanediol, and glycerin, and the like. Water or a $C_{3-6}$ dihydric or trihydric alcohol is desired as the poor solvent in view of low load on the environment, easy availability, easy handleability, or the like.

The amounts of the water-insoluble polymer, the good solvent, and the first poor solvent used may be determined, as appropriate, depending on the types of these used. The mixing amount of the water-insoluble polymer is desirably 1 part by mass or more, more desirably 5 parts by mass or more, further desirably 10 parts by mass or more relative to 100 parts by mass of the good solvent. The mixing amount of the water-insoluble polymer is desirably 40 parts by mass or less, more desirably 35 parts by mass or less, and further desirably 30 parts by mass or less relative to 100 parts by mass of the good solvent. The mixing amount of the first poor solvent is desirably 10 parts by mass or more, more desirably 20 parts by mass or more, further desirably 30 parts by mass or more relative to 100 parts by mass of the good solvent. The mixing amount of the first poor solvent is desirably 400 parts by mass or less, more desirably 200 parts by mass or less, further desirably 100 parts by mass or less relative to 100 parts by mass of the good solvent. The state of pores in an obtained porous material (for example, porosity, pore diameter, etc.) can be controlled by changing these amounts.

The solution of the water-insoluble polymer may further contain other components other than the water-insoluble polymer and the mixed solvent within a range that does not significantly impair the effect of the present disclosure.

Preparation methods of the solution of a water-insoluble polymer are not particularly limited. The water-insoluble polymer may be first dissolved in the good solvent, then the first poor solvent may be added thereto, and the mixture may be uniformly mixed. Alternatively, the water-insoluble polymer may be added to a mixed solvent of the good solvent and the first poor solvent, to dissolve the water-insoluble polymer. Known stirring devices, mixing devices, or the like may be used for the preparation of the solution. Ultrasonic irradiation, heating, and the like may be performed when the solution of the water-insoluble polymer is prepared. The heating temperature is, for example, 40° C. or higher and 100° C. or lower. After preparing the solution of the water-insoluble polymer by heating, the solution may be cooled within a range where the good solvent and the first poor solvent do not separate. This cooling is desirably performed within a range where the water-insoluble polymer does not precipitate because the precipitated water-insoluble polymer may be an impurity.

Next, the mixed solvent removal step is explained. In the mixed solvent removal step, the good solvent and the first poor solvent are vaporized (particularly, volatilized) and removed under the presence of vapor of the second poor solvent. In this mixed solvent removal step, porous skeletons of the water-insoluble polymer are formed. In this mixed solvent removal step, a resin porous material is obtained by the operation for removing the mixed solvent, specifically, vaporizing the first poor solvent, to forms pores. Typically, for example, pores are formed by phase separation between the water-insoluble polymer and a mixed solvent in which the first poor solvent is concentrated. Specifically, the first poor solvent has a higher boiling point than the good solvent, and therefore, the good solvent preferentially vaporizes prior to the first poor solvent in this step. As the amount of the good solvent decreases, the concentration of the first poor solvent in the mixed solvent increases. Since the solubility of the water-insoluble polymer in the first poor solvent is smaller than the solubility in the good solvent, the water-insoluble polymer and the mixed solvent in which the first poor solvent is concentrated are phase-separated and porous skeletons of the water-insoluble polymer are formed. This phase separation may be a spinodal decomposition. Eventually, the good solvent is removed and the water-insoluble polymer precipitates and the first poor solvent having a higher boiling point is removed by vaporization and pores generate. In this way, the porous material of the water-insoluble polymer generates. For causing the phase separation between the water-insoluble polymer and the mixed solvent in which the first poor solvent is concentrated, the type and amount of the good solvent and the type and amount of the first poor solvent may be appropriately selected.

Here, when the mixed solvent is removed by vaporization under a normally adoptable atmosphere, such as in the air or under the inert gas atmosphere, the interface between the solution of the water-insoluble polymer and the atmosphere forms the drying interface. The vaporization rate of the mixed solvent is larger at the interface of the solution than inside the solution, whereby the composition becomes heterogeneous between the interface and the inside of the solution. As a result, porosification is not occurred at the interface of the solution and a skin layer is formed at the surface of the obtained resin porous material.

In contrast, in the present disclosure, the mixed solvent is removed by the vaporization under the presence of the vapor of the second poor solvent. In other words, in the present disclosure, the mixed solvent is removed by the vaporization under an atmosphere containing the vapor of the second poor solvent. In this way, porosification due to the phase separation are actively caused at the interface of the solution of the water-insoluble polymer and the formation of skin layers at the surface portion of the obtained porous material can be suppressed.

The second poor solvent, which is used as the vapor in the mixed solvent removal step, may be the same as or different from the first poor solvent used in the solution preparation step. As one index for selecting the second poor solvent used as the vapor in the mixed solvent removal step, a poor solvent containing at least one of the first poor solvents used in the solution preparation step is desired as the second poor solvent used as the vapor in view of the affinity to the solution of the water-insoluble polymer. In one example, when one kind of a poor solvent is used in the solution preparation step, the vapor of the one kind of the poor solvent is used in the mixed solvent removal step. In another example, when two or more kinds of poor solvents are used in the solution preparation step, the vapor of one kind of the two or more kinds of the poor solvents is used in the mixed solvent removal step. In another example, when two or more kinds of poor solvents are used in the solution preparation step, the vapor of all of the two or more kinds of the poor solvents is used in the mixed solvent removal step. Since the skin layer formation-suppressing effect is higher when the water-insoluble polymer is an EVOH, the second poor solvent used in the mixed solvent removal step is desirably propyl alcohol.

As another index for selecting the second poor solvent used as the vapor in the mixed solvent removal step, a distance Ra from the HSP of the water-insoluble polymer (see the above formula) is mentioned. Here, when the distance Ra is larger, the formation of porous skeletons due to the phase separation at the surface portion of the solution of the water-insoluble polymer easily occurs since the affinity with the water-insoluble polymer is lower. Thus, although the distance Ra of the second poor solvent from the HSP of the water-insoluble polymer (in other words, the HSP distance Ra between the second poor solvent and the water-insoluble polymer) is not particularly limited, it is desirably 10 MPa$^{1/2}$ or larger since the formation of skin layers is more efficiently suppressed. When the distance Ra is 10 MPa$^{1/2}$ or larger, the shape, size, and the like of the pores at the surface portion of the obtained resin porous material can be improved.

As still another index for selecting the second poor solvent used as the vapor in the mixed solvent removal step, the boiling point is mentioned. Here, when a second poor solvent has a relatively low boiling point, it is easily vaporized and therefore, the vapor concentration can be easily raised. Thus, although the boiling point of the second poor solvent is not particularly limited, it is desirably 210° C. or lower, more desirably 160° C. or lower, further desirably 130° C. or lower, and most desirably 110° C. or lower because the formation of skin layers can be more easily and efficiently suppressed. Meanwhile, the boiling point of the second poor solvent is desirably 60° C. or higher, more desirably 70° C. or higher, and further desirably 75° C. or higher. Appropriately selecting the boiling point of the second poor solvent can improve the shape, size, and the like of the pores at the surface portion of the obtained resin porous material.

In the present description, the wording "the good solvent and the first poor solvent are vaporized under the presence of the vapor of the second poor solvent" refers to that "the good solvent and the first poor solvent are vaporized in a state where the vapor of the second poor solvent is added from the exterior to the atmosphere (under which the vaporization is performed)". Thus, the condition "under the presence of the vapor of the second poor solvent" does not include a "condition where a very small amount of vapor generated by the vaporization of the first poor solvent contained in the solution of the water-insoluble polymer exists in the atmosphere while the vapor of the second poor solvent is not separately added". The vapor concentration of the second poor solvent in the atmosphere is not particularly limited as long as the porosification occurs. The vapor concentration of the second poor solvent is, for example, 1,000 ppm by volume (that is, 0.1000 vol %) or higher, or 2,000 ppm by volume or higher. When the vapor concentration of the second poor solvent is high, many pores are easily formed at the surface portion of the porous material. Thus, the vapor concentration of the second poor solvent is desirably 6,000 ppm by volume or higher, more desirably 10,000 ppm by volume or higher, and most desirably 20,000 ppm by volume or higher.

In the mixed solvent removal step, the method for introducing the vapor of the second poor solvent into the atmosphere is not particularly limited, and the vapor of the second poor solvent can be introduced into the atmosphere according to a known method. In one example of the method, dry air, nitrogen gas, or the like is supplied to and bubbling in the second poor solvent while heating the second poor solvent, to thereby prepare gas containing the vapor of the second poor solvent, and this gas is supplied to the atmosphere in which the mixed solvent is to be vaporized.

Examples of methods for vaporizing the mixed solvent of the good solvent and the first poor solvent include a method by heating, a method by air-drying, and the like. These methods may be performed in a similar manner to known drying methods. A method by heating is desired in view of the ease of implementation of the operation. Although the heating temperature is not particularly limited, a temperature at which the mixed solvent does not boil and the water-insoluble polymer and the first poor solvent do not decompose is desired. Specifically, the heating temperature is, for example, 25° C. or higher, desirably 50° C. or higher, and more desirably 70° C. or higher. The heating temperature is, for example, 180° C. or lower, desirably 150° C. or lower, and more desirably 125° C. or lower. The heating time may be determined, as appropriate, according to the type of the solvent and the heating temperature. Since the formation of skin layers tends to be more efficiently suppressed as the heating time is longer, the heating time is desirably 15 seconds or longer and more desirably 30 seconds or longer. It is desired to leave the solution of the water-insoluble polymer to stand still during the vaporization of the good solvent and the first poor solvent.

One example of the implementation method of the mixed solvent removal step is explained with reference to FIG. 1. It should be noted that the implementation methods of the mixed solvent removal step are not limited to the methods described below.

As illustrated in FIG. 1, a tank 10 provided with a bubbler 12 and a thermocouple 14 is prepared, and the second poor solvent 20 is supplied to the tank 10. A filter housing or the like may be used as the tank 10. A heater 30 such as a rubber heater is attached to the side surface of the tank 10. The bubbler 12 of the tank 10 and a gas cylinder 40 such as a nitrogen gas cylinder are connected via a gas introduction tube 50. The tank 10 and a dry container 70 are connected via a gas delivery tube 60. The dry container 70 has a concentration meter 72 and an exhaust port (not illustrated). A hotplate 80 is placed below the dry container 70. A solution of the water-insoluble polymer is placed in a dry container 70. The tank 10 is heated by a heater 30 for easy vaporization of the second poor solvent 20. At this time, the temperature of the second poor solvent 20 is measured by the thermocouple 14, so as to manage the temperature of the second poor solvent 20. Gas is supplied to the tank 10 from the gas cylinder 40. Gas is supplied in the form of bubbles into the second poor solvent 20 by the bubbler 12. In this way, the upper part of the tank 10 is filled with gas containing the vapor of the second poor solvent 20. This gas containing the vapor of the second poor solvent 20 is supplied into the dry container 70 via the gas delivery tube 60. In this way, the vapor of the second poor solvent 20 is introduced into the atmosphere. The solution of the water-insoluble polymer in the dry container 70 is heated by the hotplate 80, to vaporize the mixed solvent. It should be noted that the temperature of the hotplate 80 is set such that the introduced vapor of the poor solvent 20 does not liquefy. Desirably, the temperature of the hotplate 80 is made higher than the temperature of the heater 30. The supply of the gas containing the vapor of the second poor solvent 20 into the dry container 70 is continued while exhausting the vaporized mixed solvent from the exhaust port of the container 70. At this time, the vapor concentration of the second poor solvent 20 is determined by the concentration meter 72, and the supply amount of the gas containing the vapor of the second poor solvent 20 and the exhausting rate from the exhaust port are managed. The vapor concentration of the second poor solvent 20 can be adjusted by changing the temperatures of the heater 30 and the hotplate 80, the bubbling rate by the bubbler 12, the heat-insulation characteristics of the gas delivery tube 60, or the like.

To obtain a porous material having a desired shape, a method in which the solution of the water-insoluble polymer is poured into a mold having a shape corresponding to the desired shape, and this mold is heated under the presence of the vapor of the second poor solvent may be desirably used. To obtain a film-shaped porous material, a method in which the solution of the water-insoluble polymer is applied in a thin-film shape on the surface of the substrate, and this thin film is heated under the presence of the vapor of the second poor solvent may be desirably used.

Since there are many beneficial uses, it is desired to obtain a film-shaped porous material in the present disclosure. The production method according to the present disclosure desirably includes, after the solution preparing step and before the mixed solvent removal step, a step (hereinafter, referred to as the "applying step") of applying the prepared solution of the water-insoluble polymer on a surface of a substrate in a thin film form.

The applying step in the case of obtaining a film-shaped resin porous material is described in detail. The substrate to be used is not particularly limited as long as it functions as a substrate. The substrate may be one which is used in a manner in which it is finally peeled off from the porous material or may be one which is used without being peeled off from the porous material. The shape of the substrate is not particularly limited, and one having a flat surface is desired. Examples of the shapes include sheet shapes, film shapes, foil shapes, plate shapes, and the like. Examples of the material constituting the substrate include resins, glass, metals, or the like.

Examples of the resins include polyethylene terephthalate (PET), polyethylene naphthalate (PEN), polyethylene (PE), polypropylene (PP), polystyrene, polyvinyl chloride, poly(meth)acrylates, polycarbonates, polyimides, polyamides, polyamideimides, and the like.

Examples of the metals include aluminum, copper, nickel, stainless steel, and the like. Composite materials, for example, fiber-reinforced resins such as glass fiber-reinforced epoxy resins may be used as a substrate.

The substrate may have a multilayered structure. For example, the substrate may have a release layer containing a fluorine resin. For example, the substrate may be a paper sheet provided with a resin layer, or the like.

When the substrate is used in an unpeeled form, the substrate may serve as a functional layer of the obtained porous material. For example, the substrate may have a function as a reinforcing material, supporting material, or the like. The substrate may be an electrode of a secondary battery (particularly, an active material layer of an electrode of a secondary battery). In this case, the production method of the resin porous material can be modified to a production method of an electrode-integrated separator of a secondary battery.

The application method of the solution of the water-insoluble polymer is not particularly limited, and may be selected, as appropriate, according to the type of the substrate. Examples of the application methods include die coating methods, gravure coating methods, roll coating methods, spin coating methods, dip coating methods, bar coating methods, blade coating methods, spray coating methods, casting methods, and the like. The application thickness is not particularly limited, and may be set, as appropriate, according to the uses of the porous material. For example, the application thickness may be 1 μm or more and 500 μm or less, and desirably 10 μm or more and 300 μm or less.

The method for heating a substrate onto which the solution of the water-insoluble polymer is applied under the presence of the vapor of the second poor solvent is as described above.

The resin porous material can be obtained in the manner as described above. The resin porous material has a three-dimension network porous structure in which pores communicate from one principal plane to the opposing principal plane because the formation of skin layers is suppressed. According to the production method of the present disclosure, a porous material having an average pore diameter of, for example, 0.5 μm or more (particularly 0.9 μm or more, further 1.4 μm or more) and 5 μm or less (particularly 4.2 μm or less, further 3.8 μm or less) can be obtained. The average pore diameter can be determined as an average of diameters of 100 or more pores in a photographed cross-sectional electron micrograph of a porous material. When the sectional shape of a pore is not spherical, the average of the maximum diameter and the minimum diameter of the pore may be regarded as a pore diameter. According to the production method of the present disclosure, a porous material with a porosity of, for example, 15% or more (particularly 42% or more, further 51.5% or more, still further 61.5% or more) and less than 80% (particularly less than 75%) can be obtained. The porosity can be calculated by a known method using a true density and an apparent density.

According to the present disclosure, an operation to cool and precipitate a molding body and an operation to replace solvents are not required and a resin porous material can be produced by the steps of preparing a solution of a water-insoluble polymer and vaporizing good solvents and poor solvents. That is, according to the present disclosure, a resin porous material can be produced in a small number of steps. In the present disclosure, the skin layer formation at the surface portion of the resin porous material is suppressed. Thus, the resin porous material can be used in a width range of uses.

Examples of the uses of the resin porous materials include packing materials, construction materials, sound absorbing material, cleaning utensils, cosmetic utensils, separation membranes, adsorbing materials, purification carriers, catalyst carriers, culture carriers, and the like. Taking advantage that electrolyte can penetrate since no skin layer is present, the resin porous material can be used as a separator for a secondary battery. When the resin porous material is applied to the use for separators, a separator can be formed directly on an active material layer, and therefore, it is advantageous in the production of separators.

Thus, the above production method can be applied to a production method of an electrode-integrated separator of a secondary battery, including the steps of preparing a solution of a water-insoluble polymer in a mixed solvent including a good solvent of the water-insoluble polymer and a first poor solvent of the water-insoluble polymer, applying the solution on an active material layer of an electrode, and vaporizing and removing the mixed solvent from the applied solution, in which the first poor solvent has a higher boiling point than the good solvent and, in vaporizing and removing the mixed solvent, the mixed solvent is vaporized and removed under the presence of vapor of a second poor solvent of the water-insoluble polymer to form pores and obtain a porous material.

When the electrode is a positive electrode, the active material layer (that is, a positive electrode active material layer) may contain a positive electrode active material. Examples of the positive electrode active material include lithium transition metal oxides (such as $LiNi_{1/3}Co_{1/3}Mn_{1/3}O_2$, $LiNiO_2$, $LiCoO_2$, $LiFeO_2$, $LiMn_2O_4$, and $LiNi_{0.5}Mn_{1.5}O_4$), lithium transition metal phosphate compounds (such as $LiFePO_4$), and the like. The positive electrode active material layer may contain other components than the active material, such as conductive materials, binders, or lithium phosphates. For example, carbon materials such as carbon black, including acetylene black (AB), or other carbon materials (such as graphite) may suitably be used as a conductive material. For example, polyvinylidene fluoride (PVDF) or the like may be used as a binder.

When the electrode is a negative electrode, the active material layer (that is, a negative electrode active material layer) may contain a negative electrode active material. Examples of the negative electrode active material include carbon materials such as graphite, hard carbon, and soft carbon, and the like. The negative electrode active material layer may contain other components than the active material, such as binders or thickeners. For example, styrene-butadiene rubbers (SBR) or the like may be used as a binder. For example, carboxymethylcellulose (CMC) or the like may be used as a thickener.

The active material layer is typically formed on a current collector. Examples of the current collector include aluminum foils, copper foils, and the like.

The operations for each step are as described above. This production method of an electrode-integrated separator of a secondary battery is excellent in that an electrode-integrated separator of a secondary battery can be produced by a small number of steps.

A separator-integrated electrode thus produced as above may be used for various types of secondary batteries according to known methods. Examples of suitable secondary batteries include a lithium secondary battery. The lithium secondary battery may be suitably used for portable power sources for personal computers, mobile devices, etc., or vehicle driving power sources for electric cars (EVs), hybrid cars (HVs), plug-in hybrid cars (PHVs), etc.

EXAMPLES

Examples relating to the present disclosure will be described below, but the present disclosure is not intended to be limited to those shown in such examples.

Example 1

In a sample bottle, 1 g of ethylene-vinyl alcohol copolymer ("EVAL L171B" produced by Kuraray Co., Ltd.; ethylene content: 27 mol %; hereinafter, referred to as the "EVOH") was weighed. To this sample bottle, 10 mL of a mixed solvent containing water and n-propyl alcohol (nPA) in a volume ratio of 5:5 as a good solvent and 1.8 mL of γ-butyrolactone (GBL) as a first poor solvent were added. The sample bottle was heated to 80° C. to 90° C. and the mixture was stirred until the EVOH was completely dissolved in these solvents, to thereby obtain an EVOH solution. After cooling the EVOH solution to 25° C., the solution was applied onto an aluminum foil, which served as a substrate, by casting. At this time, the application thickness was 100 μm.

A bubbler was attached to the lower part of a filter housing and the filter housing was connected to a nitrogen cylinder via a stainless-steel pipe. A rubber heater provided with a thermostat was wound on the filter housing. A thermocouple was attached to the filter housing and the upper part of the filter housing was connected to a box made of vinyl chloride via a polyurethane tube equipped with a valve. A concentration meter was attached to the box, and the box was placed on a hotplate. The aluminum foil onto which the EVOH solution had been applied was placed in the box. nPA as a second poor solvent was added into the filter housing and nPA was heated to 30° C. by the rubber heater. After that, nitrogen gas was supplied from a nitrogen cylinder into the filter housing, bubbling was performed using a bubbler, to thereby generate the vapor of nPA in the filter housing. Nitrogen gas containing the vapor of nPA was supplied to the box. The concentration of the vapor of nPA in nitrogen gas in the box was 6,000 ppm by volume. The HSP distance Ra between the nPA and EVOH is 7.3 MPa$^{1/2}$ and the boiling point of nPA is 97° C. The aluminum foil onto which the EVOH solution had been applied was heated at 70° C. for 30 seconds on the hotplate, to thereby vaporize and remove the good solvent and the first poor solvent. In this way, an EVOH thin film was obtained on the aluminum foil.

Example 2

An EVOH thin film was obtained on the aluminum foil in a similar manner to Example 1, except that the nitrogen gas containing the vapor of nPA was supplied to the box such that the nPA vapor concentration in nitrogen gas in the box be 20,000 ppm by volume.

Comparative Example 1

An EVOH thin film was obtained on the aluminum foil in a similar manner to Example 1, except that the good solvent and the first poor solvent were vaporized and removed without introducing the vapor of nPA into the box.

Evaluation on Liquid Penetration

An electrolyte was dropped on the front surfaces of the thin films obtained in Comparative Example 1 and Examples 1 and 2, and whether the electrolyte penetrated to the rear surface or not was evaluated by the eye. As the electrolyte, a 1.0 mol/L concentration solution of LiPF$_6$ in a mixed solvent that contains dimethyl carbonate (DMC), ethylene carbonate (EC), and ethyl methyl carbonate (EMC) in a volume ratio of DMC:EC:EMC=1:1:1 was used. Table 1 shows the results. When the electrolyte penetrates to the rear surface of the thin film, it is determined the there are no skin layers and the thin film becomes porous. On the contrary, when the electrolyte does not penetrate, it is determined that skin layers are formed.

Evaluation by SEM Observation

Figure 2:
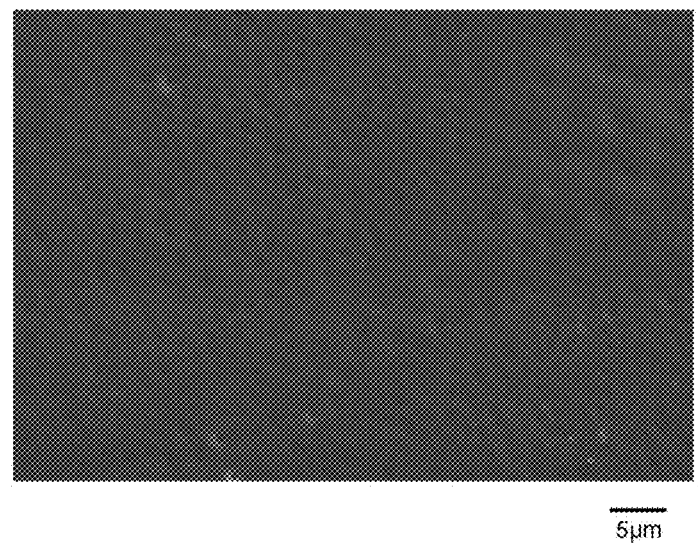
FIG. 2 is a SEM image of the surface of the thin film obtained in Comparative Example 1.
Figure 3:
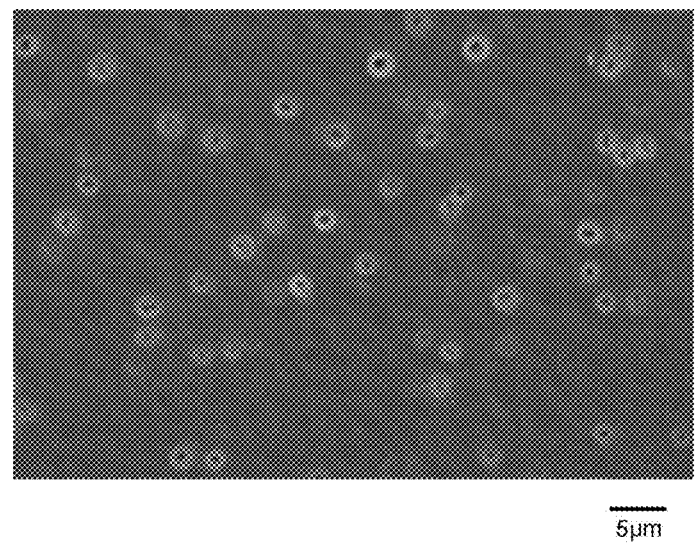
FIG. 3 is a SEM image of the surface of a thin film obtained in Example 1.
Figure 4:
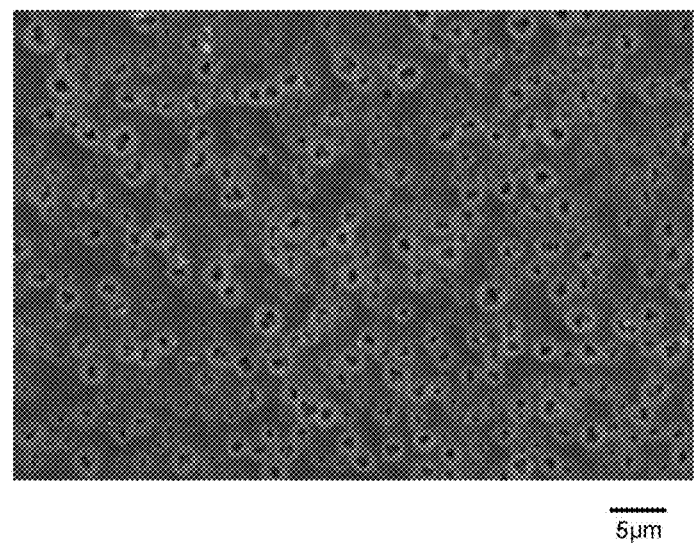
FIG. 4 is a SEM image of the surface of a thin film obtained in Example 2.

The surfaces of thin films obtained in Comparative Example 1 and Examples 1 and 2 were observed by a scanning electron microscope (SEM). FIGS. 2 to 4 respectively shows SEM images of the thin films obtained in Comparative Example 1 and Examples 1 and 2.

TABLE 1

|  | Vapor of poor solvent | | Evaluation on liquid |
| --- | --- | --- | --- |
|  | Type | Concentration (ppm) | penetration |
| Comparative Example 1 | Not used | — | Not penetrate |
| Example 1 | nPA | 6,000 | Penetrate |
| Example 2 | nPA | 20,000 | Penetrate |

As indicated by the result in Table 1, the electrolyte did not penetrate to the rear surface of the thin film in Comparative Example 1. Furthermore, as shown in the SEM image (FIG. 2), almost no pores were found on the front surface of the thin film obtained in Comparative Example 1. From this result, it is found that a skin layer was formed on the front surface of the thin film in Comparative Example 1.

On the contrary, the electrolyte penetrated to the rear surface of the thin film in Examples 1 and 2. Furthermore, as shown in the SEM images (FIGS. 3 and 4), many pores were found on the front surfaces of the thin films obtained in Examples 1 and 2. From this result, it is found that in Examples 1 and 2, the thin film was made porous while no skin layers were formed on the thin film. When FIGS. 3 and 4 are compared, it is found that as the vapor concentration of the poor solvent was higher, the number of pores at the surface were larger, and the skin layer formation-suppressing effect was higher.

In the above Examples, the steps essential for producing resin porous materials were the steps for preparing a solution of a water-insoluble polymer and removing a mixed solvent by vaporization. Thus, from the above results, according to the present disclosure, it is found that a resin porous material can be produced from a water-insoluble polymer in a small number of steps while suppressing the formation of skin layers.

Example 3

An EVOH thin film was obtained on the aluminum foil in a similar manner to Example 1, except that the type of the second poor solvent, which was introduced as vapor, was changed from nPA to ethyl acetate and the temperature of the rubber heater was set to 50° C. The HSP distance Ra between ethyl acetate and EVOH is 10.6 MPa$^{1/2}$, and the boiling point of ethyl acetate is 77° C.

Example 4

An EVOH thin film was obtained on the aluminum foil in a similar manner to Example 1, except that the type of the second poor solvent, which was introduced as vapor, was changed from nPA to ethyl acetate and the temperature of the rubber heater was set to 60° C. Since the temperature of the rubber heater in Example 4 was higher than in Example 3, the vapor concentration of the second poor solvent in Example 4 was higher than in Example 3.

Example 5

An EVOH thin film was obtained on the aluminum foil in a similar manner to Example 4, except that the drying time on the hotplate was changed to 15 seconds.

Example 6

An EVOH thin film was obtained on the aluminum foil in a similar manner to Example 4, except that the drying time on the hotplate was changed to 60 seconds.

Example 7

An EVOH thin film was obtained on the aluminum foil in a similar manner to Example 1, except that the type of the second poor solvent, which was introduced as vapor, was changed from nPA to 1,4-dioxane, and the temperature of the rubber heater was set to 60° C. The HSP distance Ra between 1,4-dioxane and EVOH is 13.2 MPa$^{1/2}$, and the boiling point of 1,4-dioxane is 101° C.

Example 8

An EVOH thin film was obtained on the aluminum foil in a similar manner to Example 1, except that the drying temperature on the hotplate was set to 90° C.

Example 9

An EVOH thin film was obtained on the aluminum foil in a similar manner to Example 1, except that the type of the second poor solvent, which was introduced as vapor, was changed from nPA to methyl ethyl ketone (MEK) and the temperature of the rubber heater was set to 60° C. The HSP distance Ra between MEK and EVOH is 10.1 MPa$^{1/2}$, and the boiling point of MEK is 80° C.

Example 10

An EVOH thin film was obtained on the aluminum foil in a similar manner to Example 9, except that the drying time on the hotplate was changed to 60 seconds.

Evaluation on Surface Porosity

The surfaces of thin films obtained in Examples 3 to 10 were observed by a scanning electron microscope (SEM) and surface SEM images were obtained. The percentages (%) of pores on the thin film surface were determined using these surface SEM images. Specifically, the area of each pore existing in a predetermined area at the surface of a thin film was measured and the total area of pores in the predetermined area at the surface of the thin film was determined. Then, proportion of pores (%)=(total area of pores/predetermined area at the surface of a thin film)×100 was calculated. The degree of porosity of a surface was evaluated in accordance with the following criteria. This evaluation was also made for Examples 1 and 2 and Comparative Example 1. Table 2 shows the results.

A: Proportion of pores was 25% or more
B: Proportion of pores was 5% or more and less than 25%
C: Proportion of pores was 1% or more and less than 5%
D: Proportion of pores was less than 1%

Figure 5:
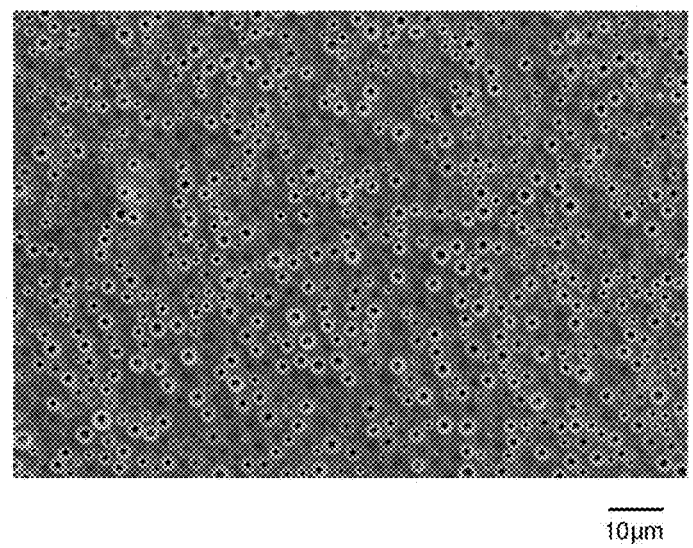
FIG. 5 is a SEM image of the surface of a thin film obtained in Example 4.
Figure 6:
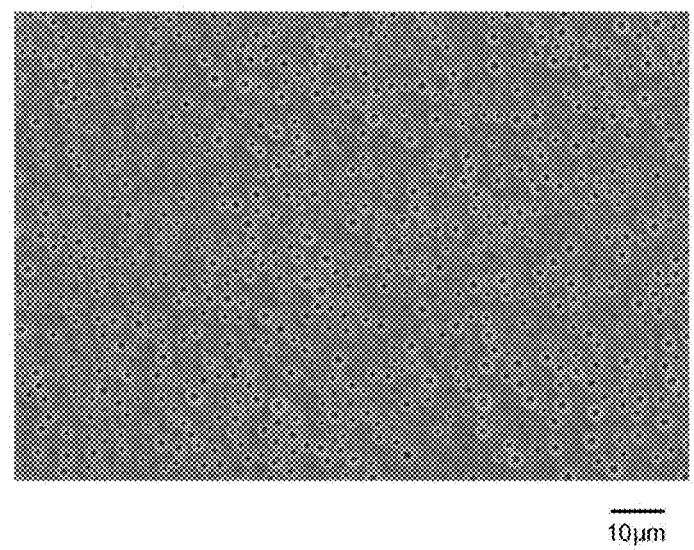
FIG. 6 is a SEM image of the surface of a thin film obtained in Example 5.
Figure 7:
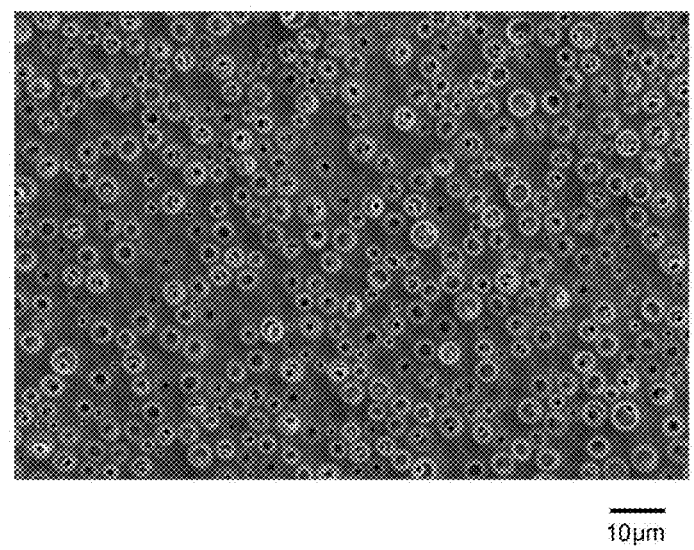
FIG. 7 is a SEM image of the surface of a thin film obtained in Example 10.

As references, surface SEM images of the thin films obtained in Examples 4, 5, and 10 are respectively shown in FIGS. 5 to 7.

TABLE 2

| | Vapor of poor solvent | Ra (MPa$^{1/2}$) | Boiling point (° C.) | Drying temperature | Drying time | Concentration of vapor | Surface porosity |
|---|---|---|---|---|---|---|---|
| Comparative Example 1 | Not used | — | — | 70 | 30 | 0 | D |
| Example 1 | nPA | 7.3 | 97 | 70 | 30 | High | A |
| Example 2 | nPA | 7.3 | 97 | 70 | 30 | Low | C |
| Example 3 | Ethyl acetate | 10.6 | 77 | 70 | 30 | Low | B |
| Example 4 | Ethyl acetate | 10.6 | 77 | 70 | 30 | High | A |
| Example 5 | Ethyl acetate | 10.6 | 77 | 70 | 15 | High | B |
| Example 6 | Ethyl acetate | 10.6 | 77 | 70 | 60 | High | A |
| Example 7 | 1,4-dioxane | 13.2 | 101 | 70 | 30 | Low | A |

TABLE 2-continued

| | Vapor of poor solvent | Ra (MPa$^{1/2}$) | Boiling point (° C.) | Drying temperature | Drying time | Concentration of vapor | Surface porosity |
|---|---|---|---|---|---|---|---|
| Example 8 | 1,4-dioxane | 13.2 | 101 | 90 | 30 | Low | A |
| Example 9 | MEK | 10.1 | 80 | 90 | 30 | Low | A |
| Example 10 | MEK | 10.1 | 80 | 90 | 60 | Low | A |

As indicated by the results in Table 2, when ethyl acetate, 1,4-dioxane, and MEK were used as the second poor solvents which were introduced as the vapor, the degrees of porosity of the thin film surfaces became large even if the vapor concentration was low when compared to the case where nPA was used.

As indicated by the results of FIGS. 4 to 7, when nPA was used, the shapes of pores were distorted, whereas when ethyl acetate, 1,4-dioxane, and MEK were used, the shapes of pores were circular and uniform.

From the above results, it is found that ethyl acetate, 1,4-dioxane, and MEK have a higher ability to make the surface porous than nPA and are excellent as the second poor solvents which are introduced as the vapor. Here, the distances (Ra) of ethyl acetate, 1,4-dioxane, and MEK from the HSP of the EVOH are each 10 MPa$^{1/2}$ or larger. Here, when the distance (Ra) is larger, the affinity with the EVOH is lower, and therefore, the formation of porous skeletons due to the phase separation easily occurs. Thus, it is found that the distance (Ra) from the HSP of the EVOH of 10 MPa$^{1/2}$ or larger is more advantageous for suppressing the formation of skin layers.

What is claimed is:

1. A production method of a resin porous material, the method comprising:
   preparing a solution of a water-insoluble polymer in a mixed solvent including a good solvent of the water-insoluble polymer and a first poor solvent of the water-insoluble polymer and
   vaporizing and removing the mixed solvent from the solution, wherein
   the first poor solvent has a higher boiling point than the good solvent and,
   in vaporizing and removing the mixed solvent, the mixed solvent is vaporized and removed under the presence of vapor of a second poor solvent of the water-insoluble polymer to form pores and obtain a porous material, and
   the method further comprises, after preparing the solution and before vaporizing and removing the mixed solvent, applying the prepared solution of the water-insoluble polymer on a surface of a substrate in a thin film form.

2. The production method according to claim 1, wherein a concentration of the vapor of the second poor solvent is 6,000 ppm by volume or higher.

3. The production method according to claim 1, wherein a distance Ra of the second poor solvent from the HSP of the water-insoluble polymer is 10 MPa$^{1/2}$ or larger.

4. The production method according to claim 1, wherein the second poor solvent has a boiling point of 210° C. or lower.

5. The production method according to claim 1, wherein the water-insoluble polymer is an ethylene-vinyl alcohol copolymer.

6. The production method according to claim 1, wherein the substrate is an electrode of a secondary battery.

* * * * *